United States Patent [19]

Kinneberg

[11] Patent Number: 5,698,663
[45] Date of Patent: Dec. 16, 1997

[54] POLYKETONE POLYMER POWDER COATINGS

[75] Inventor: Peter Kinneberg, Houston, Tex.

[73] Assignee: Shell Oil Company, Houston, Tex.

[21] Appl. No.: 533,898

[22] Filed: Sep. 26, 1995

[51] Int. Cl.$^6$ .................. C08G 67/00; B05D 1/00
[52] U.S. Cl. .................. 528/392; 528/271; 525/185; 525/539; 524/449; 524/612; 427/195; 427/197; 427/203; 427/224; 427/228; 427/385.5; 427/407.1; 427/423
[58] Field of Search .................. 528/392, 271; 525/539, 185; 524/449, 612; 427/195, 197, 385.5, 203, 224, 228, 407.1, 423

[56] References Cited

U.S. PATENT DOCUMENTS

| | | | |
|---|---|---|---|
| 2,495,286 | 1/1950 | Brubaker | 528/392 |
| 3,520,861 | 7/1970 | Thomson et al. | 428/500 |
| 4,351,931 | 9/1982 | Armitage | 526/227 |
| 4,818,811 | 4/1989 | Drent | 528/392 |
| 4,861,675 | 8/1989 | George | 428/501 |
| 4,871,618 | 10/1989 | Kinneberg et al. | 528/392 |
| 4,880,865 | 11/1989 | George | 524/449 |
| 4,880,904 | 11/1989 | Kinneberg et al. | 528/392 |
| 4,935,304 | 6/1990 | Danforth | 525/455 |
| 4,985,278 | 1/1991 | George | 427/195 |
| 5,066,701 | 11/1991 | George et al. | 524/417 |
| 5,141,981 | 8/1992 | George et al. | 524/417 |
| 5,166,266 | 11/1992 | Machado et al. | 525/134 |
| 5,219,954 | 6/1993 | Machado | 525/502 |
| 5,227,420 | 7/1993 | Kastelic et al. | 524/449 |
| 5,227,437 | 7/1993 | George | 528/392 |
| 5,274,040 | 12/1993 | Machado | 525/134 |

*Primary Examiner*—P. Hampton-Hightower
*Attorney, Agent, or Firm*—Todd F. Volyn

[57] ABSTRACT

Powder coatings made from a blend of one or more polymers of carbon monoxide and at least one ethylenically unsaturated hydrocarbon (polyketone), and a compatible material are presented. The compatible materials can comprise another polyketone or novolac resins.

4 Claims, No Drawings

POLYKETONE POLYMER POWDER COATINGS

BACKGROUND OF THE INVENTION

Powder coatings have been utilized as an alternative to liquid spray applied finishes. These coatings typically serve at least two major purposes: (1) they provide a decorative finish and/or (2) provide a functional or protective coating. Thermoset coatings comprise the major portion of the powder coating market. This class of coatings include epoxy resins, polyurethanes, polytetraglycidyl isocyanate (TGIC) polyesters and acrylics. Major applications for these systems include coatings for both functional and decorative purposes, such as metal furniture, pole mounted transformers, electrical insulation and a variety of fabricated metal products. The thermoset coatings offer durability, high temperature performance, corrosion and chemical resistance and outstanding electrical properties.

Thermoplastic coatings, on the other hand, are often used as functional coatings for metal parts. This class of coatings is dominated by polyvinyl chloride, but the use of nylons, polyphenylene sulfide and fluoropolymers is increasing. These coatings offer excellent abrasion resistance, wear properties, are much more flexible in comparison to the thermoset coatings, and in the case of polymers such as the fluoropolymers, offer excellent chemical resistance.

The protection of pipe used in sulphur mining is an exemplary coatings application. The environment surrounding the piping down-hole is extremely harsh. Formation water is rich in sodium chloride, calcium carbonate and other salts in a hydrogen sulfide environment. The lifetime for a typical well is two and one-half years yet uncoated steel pipe can survive for only between one-half to one year. The removal or replacement of the pipe is very expensive. Epoxy resins coatings which are currently used for such applications require curing agents which can pose environmental concerns. This is particularly true where the curing agents include methylenedianiline (MDA).

Pipes used in such applications are also subjected to significant stress and torque. When thermosets are used as the coating materials they can be damaged or cracked during installation. Thus, there is a pressing need for a pipe coating for this application which provides good chemical resistance, good high temperature properties, flexibility, and a long life without the use of materials which present environmental hazards. The present invention is directed to such suitable materials and processes for their application.

Coatings of this nature are also useful in the fabrication of food processing equipment especially where autoclaving/ high temperature sterilization of the equipment is contemplated. Additionally, tank linings, pump and pump components, mixers, agitators, hoppers, architectural/ structural applications, industrial piping systems could also benefit from such coatings. This is particularly true where the environment in which they are used contains harsh chemicals such as hydrocarbon solvents, high temperatures, or other severe characteristics. This presents the petrochemical, automotive, machine/machine tool, and industrial products industries with new coatings options.

The use of thermosets as coatings materials also limits the manner in which the coatings can be applied. In most instances it is not possible to use flame spray and plasma jet methods of applications. This makes it difficult, if not impossible, to use thermosets to conduct field repairs and applications in the environment in the which the substrate is fixed in place. Fluoropolymers have similar limitations because flame spraying and other high temperature applications risk the release of fluorocarbons into the atmosphere.

Another limitation of previously employed thermoplastic coating systems is that most, if not all, require the use of a primer on the substrate to achieve good adherence of the coating to the substrate. For example, when polyamides are used an adhesion promoter is ordinarily applied to the substrate to be coated in thicknesses of about 10 µm prior to the application of the polyamide. These primers usually also require the presence of solvents such as MEK. Of course, this can also present environmental difficulties. Moreover, polyamides hydrolyze. This makes drying or dry conditions an important prerequisite to their use in such applications. These factors all incur additional cost, time, and materials which might otherwise be eliminated.

U.S. Pat. No. 4,861,675 to George is directed to flame spray coating with polyketones. There is no reference to improving the properties of the coating through the addition of a compatible material. U.S. Pat. No. 4,985,278 to George proposes a flame spray process for the application of polyketone polymers which involves coating a material with the polyketone, then thermally degrading the surface of the first coating, and then applying a coating of a second polymeric material. The second polymeric material is generally a blend of polyketone and a polymer of ethylene and an ethylenically unsaturated carboxylic acid. Flame spraying polyketone without a second coating is also proposed but is not preferred. In any case, the coating is either applied without an additional compatible material or layers are applied sequentially with the intermediate step of surface preparation. Neither of these patents discuss fluidized bed or electrostatic spray coating techniques.

U.S. Pat. No. 4,935,304 to Danforth proposes a wire coating comprising a blend of polyketone and polyurethane polymers. The coating is applied to the wire by feeding the wire through a die along with polymer via an extruder.

U.S. Pat. No. 5,227,437 to George proposes an isomorphic blend of copolymers and terpolymers of polyketones. The patent makes no reference to the use of such materials in powder coating applications and is more precisely directed to injection molding applications.

It has been found that polyketone polymer powder blends can be used effectively in powder coatings applications. This is especially attractive in harsh environments because they have the following properties: (1) superior chemical resistance, (2) superior barrier to gases, (3) superior tribological properties, (4) superior metal adhesion, (5) superior retention of mechanical properties at elevated temperatures, (6) flexibility in processing and application of the polymer, (7) low moisture absorption. Powder coatings comprised of polyketone polymers alone have utility in this regard. When certain compatible materials are used in conjunction with the polyketones the advantages presented by the properties of the polyketone are enhanced further still.

SUMMARY OF THE INVENTION

One aspect of this invention is a powder coating material comprising a blend of one or more linear alternating polymers of carbon monoxide and at least one ethylenically unsaturated compound and a compatible material. The compatible material can be a copolymer of carbon monoxide and an ethylenically unsaturated hydrocarbon or a novolac resin.

In another aspect of this invention powder coatings comprising a linear alternating polyketone terpolymer and a linear alternating polyketone copolymer or a novolac resin are electrostatically coated or fluidized bed coated onto a substrate.

DETAILED DESCRIPTION OF THE INVENTION

Generally speaking the materials useful in the practice of this invention include a linear alternating polymer of carbon monoxide and at least one ethylenically unsaturated hydrocarbon, a compatible material, and other common polymer additives. For instance, fillers, extenders, other lubricants, pigments, plasticizers, and other polymeric materials can be added to the compositions to improve or otherwise alter the properties of the composition. In general, the practice of this invention involves suitably contacting sufficient quantities of the useful material to form the inventive powder coating.

The term "polyketone" as used herein refers to linear alternating polymers of carbon monoxide and at least one ethylenically unsaturated olefin which are now well known in the art. This class of polymers is disclosed in numerous U.S. patents assigned to Shell Oil Company, exemplified by U.S. Pat. Nos. 4,880,865 and 4,818,811 which are incorporated herein by reference. Polyketone polymer is the major component of the inventive powder coating of this invention.

The polyketone polymers are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

One of the preferred polyketone polymers useful as a powder coating in this invention is a terpolymer. The major polymeric component this terpolymer comprises about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone terpolymer is therefore represented by the repeating formula

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the ―(CO―(CH$_2$―CH$_2$)―units and the ―CO―(G)―units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g.

Preferred methods for the production of the polyketone polymers are illustrated by U.S. Pat. Nos. 4,808,699 and 4,868,282 to van Broekhoven, et al. which issued on Feb. 28, 1989 and Sep. 19, 1989 respectively and are herein incorporated by reference. U.S. Pat. No. 4,808,699 teaches the production of linear alternating polymers by contacting ethylene and carbon monoxide in the presence of a catalyst comprising a Group VIII metal compound, an anion of a nonhydrohalogenic acid with a pKa less than 6 and a bidentate phosphorous, arsenic or antimony ligand. U.S. Pat. No. 4,868,282 teaches the production of linear random terpolymers by contacting carbon monoxide and ethylene in the presence of one or more hydrocarbons having an olefinically unsaturated group with a similar catalyst.

Powder coatings can be made from one or more of these polyketone polymers alone. However, powder coatings which incorporate an additional compatible material result in the following enhanced properties: higher operating temperatures, flowability/wet-out/ease of application, hardness, water vapor transmission rate, tribological properties, adhesion, dimensional stability, toughness, and barrier characteristics. Additionally, compatible materials such as epoxy resins can be employed in concert with the polyketone to produce coatings comprised of essentially new materials with novel properties. Thus, one can tailor the properties of the coating to the application through the inclusion of one or more compatible materials. Indeed, even factors such as cost can be adjusted through this approach. For example, one could include commodity polymers as a compatible material where the application is cost sensitive.

As for the compatible material, it may be in the powder coating in any amount. However, between 10 to 50 weight percent of compatible materials is preferred. As used in this specification, the term compatible material refers to a material which does not negatively affect the chemical or mechanical properties of the polyketone polymer, is processable via fluidized bed, flame spraying, and/or electrostatic spray and improves one or more of the chemical or physical properties of the resulting coating. The compatible materials may or may not be miscible with polyketone polymer.

Examples of compatible polymers include but are not limited to flouropolymers such as poly(vinylidene fluoride) and poly(tetrafluoroethylene), novolac and epoxy resins, and other terpolymers and copolymers of polyketone with lower propylene content. The most preferred compatible material is a linear alternating copolymer of carbon monoxide and ethylene referred to as "polyketone E." Polyketone E is prepared as set forth above and has essentially no propylene content. Its inclusion with copolymers of carbon monoxide, ethylene, and propylene ("polyketone EP") increases the operating temperature (melting point), heat distortion temperature, improves chemical resistance, improves the barrier properties, and increases the percent crystallinity of the resulting coating beyond those of polyketone EP alone. These properties are particularly enhanced when the powder coating is comprised of between about 10 and 20 wt % polyketone E. Powder coatings can also include poly (ethylene-co-vinyl alcohol), poly(styrene co-acrylonitrile), polyamides, functionalized polyolefins such as poly (ethylene-co-acrylic acid), poly(propylene-g-maleic anhydride), and other materials which can contribute to the coating through the properties of the materials so blended.

The inclusion of flouropolymers as a compatible material enhances tribological and barrier properties. Novolac resins improve flowability and adhesion. Epoxy resins improve adhesion when polyketones are the major component but, conversely, polyketones can also be used as the compatible material with the major component comprising epoxy resins. This can be done to lower the cost of the coating and improve ductility and toughness without reducing $T_g$.

Epoxy resins suitable for use in this invention include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A (hereafter "BPA") are represented below by structure I wherein n is 0 or a number between about 0 and 10, commonly in the range of 0 to 6, and preferably in the range between about 1 and 4.

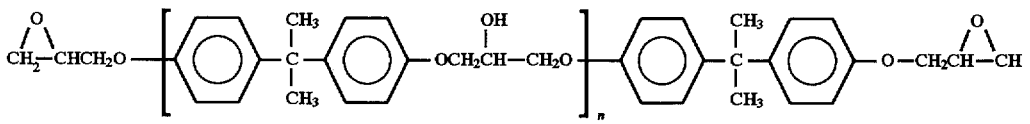

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of about 200 to about 6000, preferably about 350 to about 2000. The commercially available epoxy resin EPON® Resin 1001, a reaction product of epichlorohydrin and BPA having a molecular weight of about 1100, an epoxide equivalent (ASTM D-1652) of about 525 to 550 and EPON® Resin 155, a reaction product of epichlorohydrin and phenolic novolac, having a molecular weight of about 350 and an epoxide equivalent weight of about 174 to 180 are presently the preferred epoxy resins.

Novolac resins suitable for use in this invention are the condensation product of a phenol and an aldehyde, when the aldehyde is present in a less than stoichiometric amount, and the reaction is conducted in an acid media. These novolac resins are well known in the art. In a typical synthesis, novolacs are prepared by combining a slight molar excess of phenol, such as about 15%, with formaldehyde under acidic conditions at a temperature from about 25° C. to about 175° C.

The novolac structures produced in this reaction may be approximately represented by the following general formula:

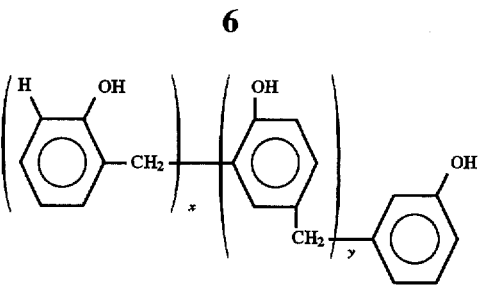

wherein the sum of x and y is from about 2 to about 200. Illustrative phenols, useful to prepare novolac resins, include phenol, cresol, xylenol, and substituted phenols such as ethylphenol, butylphenol, isopropylmethoxyphenol, chlorophenol, resorcinol, napthol, and the like and mixtures of such phenols. Illustrative aldehydes include formaldehyde, paraform, acetaldehyde, acrolein, furfural, and the like. U.S. Pat. No. 3,438,931 to Mitchell et al. discloses both resole and novolac resins and their methods of production and is incorporated herein by reference.

Novolac resins are not heat-curable per se. Heat curable resins progressively polymerize under application of heat. Novolac resins are cured in the presence of a curing agent, such as formaldehyde, hexamethylenetetramine, paraformaldehyde, and the like. In the presence of such curing agents, novolac resins are heat curable. The novolac resins of this invention are employed as an uncured blend component, in combination with the polyketone polymer of this invention.

The process of producing the inventive powder coating involves the steps of blending the components, reducing the blend into a powder, and using the powder to make powder coatings. The blending can be performed by utilizing conventional techniques and equipment known in the art. For example, pellets of the polyketone polymer and the compatible polymer can be dry tumbled and melt compounded on a single or twin screw extruder. Alternatively, a Banbury Mixing Head can be used in place of an extruder. Presently, it is preferred to blend two or more components of the powders with a single or twin screw extruder. Regardless of the method and/or blending equipment used, the goal is to produce a homogenous blend.

The step of converting the blend into a powder can be accomplished by ambient or cryogenic grinding of the blend pellets into a powder. Ambient grinding is preferred since it generally incurs less expense. It is preferred that a disk mill having two disks such as a Wedco Thermo-Fine™ grinding mill be used for ambient grinding. However, any method and/or equipment known in the art that is suitable for the conversion of pellets to powder is appropriate for use in the practice of this invention.

When grinding is conducted in a grinding mill, the powder coating component pellets are first fed into the interstices of the disks and subjected to rotational force. The materials are then ground to a sufficiently small particle size and separated from those which are not through the use of a mesh screen.

Particle size determines coating thickness. This will, of course, be application dependent. Generally, for coatings applied via fluidized bed and flame spray, the particle sizes of the powder should be no greater than about 210 microns to achieve coatings of up to about 500 microns thick. It is possible to attain thicker coatings in which case particle sizes would be proportionally higher. For coatings applied via electrostatic spray, the particle sizes should be no greater than about 10 to 100 microns with a high percentage in the 30 to 50 micron range to achieve coating thicknesses of between about 130 to 180 microns.

The powder can then be applied as a coating to a suitable substrate by means of any of the known art methods inclusive of fluidized bed, electrostatic spraying, flame spraying or a combination thereof. The first step in the application process is generally the preparation of the substrate. Suitable substrates include metal and non-metal substrates. Thus far, the only restriction on selection of substrates is that they be able to withstand the preheat temperatures required for the application of the coating. Typically, this means that the substrate must not decompose or degrade upon exposure to temperatures between about 120° to 350° C. In most cases, it is enough that the substrate not so decompose or degrade at temperatures of about 260° C. Examples of suitable metal substrates include steel, tin, aluminum, iron, and other commonly used industrial metals. Non-metallic substrates can be exemplified by concrete, glass, other polymeric materials, wood, paper and substrates composed of fibers such as cotton cloth.

The first step in the preparation of the substrate is pre-treatment. A greasy or dirty substrate surface can negatively affect the final adhesion of the coatings. On the other hand, a surface which is chemically or mechanically cleaned of grease, dirt, rust or corrosion contributes to the adhesion of the coating. An example of mechanical treatment is sandblasting to a near white finish with an anchor pattern 1–3 mils deep. An example of chemical pre-treatment is phosphate treatment. Nonmetallic substrates can be pre-treated through standard degreasing and cleaning processes. Polymeric substrates may benefit from corona treatment prior to the application of the coating. Moreover, where extra expense or materials is not an issue or where certain special performance characteristics are desired, a primer may also be used.

Once the substrate is prepared, the coating may be applied. The most preferred coating applications are fluidized bed and electrostatic coating. In fluidized bed processes, the substrate is preheated to a temperature at which the polymer to be applied will adhere thereto. This is generally above the melting point of the polymer but can be subject to modification as will be understood by one skilled in the art. For example, the coating thickness to be attained in this technique is in part a function of the preheating temperature of the substrate. Thicker coatings generally require higher temperatures. The powder coating materials are placed in a vessel having a porous plate suitable for fluidized bed coatings. Air is then introduced in the bottom of the vessel such that it flows through the porous membrane and fluidizes the powder. The substrate is then dipped or immersed in the vessel until properly coated. Again, coating thickness is a function, in part, of the immersion time in the bed and the heat capacity of the part. The part is then removed from the bed and either placed in a curing oven, air dried, or quenched, for example in a water bath as one skilled in the art will readily appreciate.

In electrostatic coating operations, the properly prepared part to be coated can be, but typically is not, preheated. The substrate is grounded. Powder coating materials are charged into a reservoir or feed that comprises an electrostatic gun such as a NORDSON brand gun (a commercially available electrostatic powder spray system from Nordson Corporation). The powder coating is then ejected through the gun which conducts a charge to the powder as it passes through it. The powder so ejected is attracted to the surface of the substrate and thereby adheres to it. The part is then placed in an oven to fuse the coating.

Other techniques including but not limited to flame spray and plasma jet spray applications can be used to apply the powder coatings of this invention. Coatings produced according to this invention can be used to protect substrates from the effects of its environment. For example, pipe surfaces can be made to withstand the harsh down-hole effects of sulphur mines. MTBE, sour crude, and alkaline chemical containment vessels can be beneficially lined with these coatings to preserve their surfaces and structural integrity.

The invention is further illustrated by the following non-limiting examples and data tables.

EXAMPLES

Steel coupons (1×3 inches, ⅛ inch thick)were preheated to 600 F. The coupons had no sharp corners and had been sandblasted to a white metal finish in a 2–3 mil deep anchor pattern. They were then coated with the materials set forth in the Tables. The powder coating materials used included polyketone terpolymer (EP), polyketone copolymer (E) and HRJ-2190 brand novolac resin (commercially available from Schenectady Chemical Co.). Where blends were used, they were prepared by dry tumbling and melt compounding on a 30 mm Haake Extruder. The blend was then converted into a powder by cryogenically grinding on a Mikro Pulverizer. The cryogenically ground powder was then dried overnight in a vacuum oven with a slight nitrogen purge. The powder was applied to the steel coupons at a thickness of 15–20 mil via a fluidized bed technique and air dried.

The coated steel coupons were then placed in an autoclave and tested under the following conditions. The coupons were immersed in a solution containing twenty (20%) percent sodium chloride. The autoclave temperature was heated to 149° C.

The steel coupons were removed and inspected after one hour. Partial or complete delamination of the coating from the substrate was considered a failure. Each coupon tested passed to this point. The coupons were then further maintained in the same solution at 165° C. for 18 hours. As noted in Table 1, the coupon coated with polyketone EP failed this test.

Coupons coated with the same materials were further tested as follows. They were immersed in solution comprising 10% salt, and various sulfides, polythionates, and other sulfur containing materials similar to the mix one would find in bleed water from a sulphur mine. Molten sulphur was added to the solution containing the coupons and placed in an autoclave. The temperature of the autoclave was ramped to about 160° C. with a pressure of about 80 psig. The autoclave was then pressurized to 150 psig with hydrogen sulfide and then to 215 psig with carbon dioxide. The autoclave was depressurized weekly and then repressurized with hydrogen sulfide and carbon dioxide to simulate down-hole sulphur mine conditions.

The components of the material(s) used in coating the steel coupons, and the performance of the coupons is shown in Tables 1 and 2.

TABLE 1

| | 1 Hour Test | | |
|---|---|---|---|
| Sample # | Composition | 149° C. | 165° C. |
| 1 | EP | pass | fail |
| 2 | E | pass | pass |
| 3 | 20/80 wt/wt E/EP | pass | pass |

EP is a linear alternating terpolymer of carbon monoxide and ethylene plus a minor amount of propylene (LVN 1.1).
E is a linear alternating copolymer of carbon monoxide and ethylene (LVN 1.4)

TABLE 2

| | 4 Weeks Test | |
|---|---|---|
| Sample # | Composition | Result |
| 2 | EP | fail |
| 4 | 20/80 wt/wt E/EP | pass |

The results in Tables 1 and 2 show that while both E and EP individually passed the one hour test, only the blend of E and EP passed the prolonged four weeks test which evidence the substantially improved weatherability/protective properties of this material relative to the prior art. As shown in Table 3, the melting point range of Sample 4 (E/EP) increased under saturated conditions from 170° to 190° C. compared to the EP melting point range of 130°–180° C. This increase in the melting temperature of EP is a result of its blending with a compatible material (E) prior to the formation of a powder coating.

DSC traces were used to determine the melting point of the material before and after blending. The results are shown in Table 3.

TABLE 3

| | DSC Results | |
|---|---|---|
| Sample | Melting Point Range "dry" | Melting Point Range "saturated" |
| EP | 215 to 225° C. | 130 to 180° C. |
| 20% E/EP | 200 to 260° C. | 170 to 190° C. |
| E | 235 to 260° C. | 170 to 190° C. |

Heated at 5° C./min. Samples were powders placed in DuPont aluminum pans. "Dry" refers to the melting point determined when the coating is in ambient conditions while "wet" refers to the melting point of the coating in saturated (with water) conditions. The reduction in melting point is believed to be due to plasticization of the polymer(s).

This invention demonstrates that the addition of polyketone copolymer to polyketone terpolymer increases the end use or service temperature limit of the polyketone terpolymer in saturated environments. This enables the use of the terpolymer in many applications for which it was otherwise unsuitable. These applications are not limited to powder coatings, but applies to all wet environment applications. Examples include rotational molded, blow molded, or injection molded parts for chemical containment surrounded by saturated solutions at temperatures above 165° C. This invention also demonstrates that the blending of the terpolymer with one or more compatible material allows one to tailor properties for specific applications.

Steel coupons were also prepared as set forth above and coated in the same manner with a powder coating comprising 10 wt % and 20 wt % mixtures of HRJ 2190 brand novolac resins and polyketone EP (based on total weight of coating). The coatings were evenly applied at a thickness of about 15–20 mils and had a translucent appearance. They were not tacky and were harder than coatings prepared with polyketone EP alone. The material floweded and dispersed along the substrate surface better than did the coating material prepared with polyketone EP alone indicating better wettability.

While this invention has been described in detail for the purpose of illustration, it is not to be construed as limited thereby but is intended to cover all changes and modifications within the spirit and scope thereof.

What is claimed is:

1. A powder coating composition comprising a mixture of two different linear alternating polyketone polymers, said mixture comprising about 80% wt of a first linear alternating polyketone comprising a terpolymer and about 20% wt of a second linear alternating polyketone (based on total weight of said mixture) comprising a copolymer wherein said second linear alternating polyketone is different from said first linear alternating polyketone.

2. A method of coating a substrate with a polymer comprising electrostatically spraying a powder coating composition comprising a mixture of two different compositions, said mixture comprising a linear alternating polyketone and a member of the group consisting of a different linear alternating copolymer of carbon monoxide and ethylene and novolac resins onto said substrate.

3. A method of coating a substrate with a polymer comprising applying a powder coating composition comprising a mixture of two different compositions, said mixture comprising a linear alternating polyketone and a member of the group consisting of a different linear alternating copolymer of carbon monoxide and ethylene and novolac resins onto said substrate via a fluidized bed.

4. In a method of coating a substrate with a polymer via flame spray, the improvement consisting of employing a powder coating composition consisting essentially of a mixture of two different compositions, said mixture comprising a linear alternating polyketone and a member of the group consisting of a different linear alternating copolymer of carbon monoxide and ethylene and novolac resins as said polymer coating.

* * * * *